May 31, 1960 W. T. ROLLINGS 2,938,689
SHOCK-ABSORBING AIR CUSHION
Filed Jan. 16, 1958 2 Sheets-Sheet 1
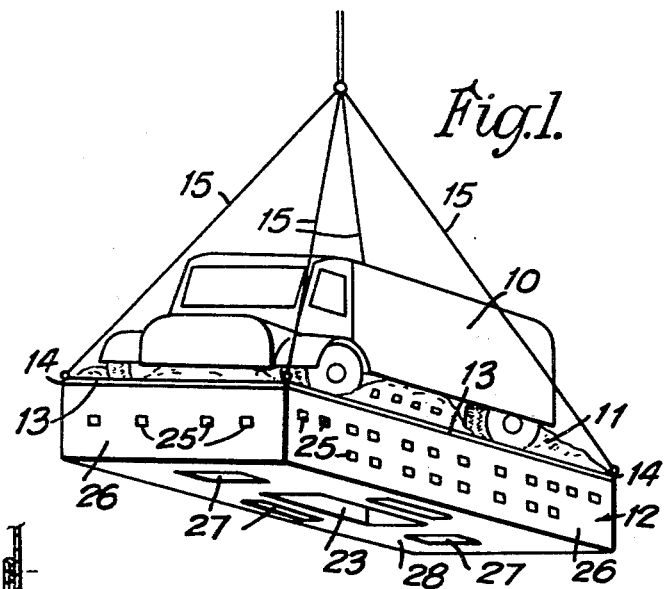
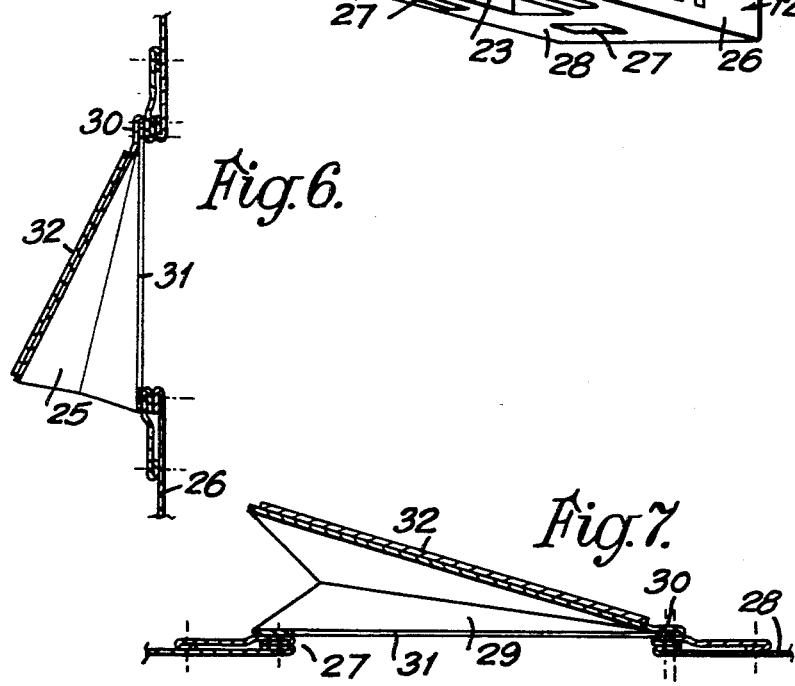
INVENTOR
William T. Rollings
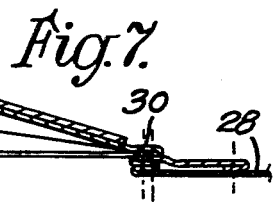
ATTORNEYS May 31, 1960  W. T. ROLLINGS  2,938,689
SHOCK-ABSORBING AIR CUSHION
Filed Jan. 16, 1958  2 Sheets-Sheet 2

INVENTOR
William T. Rollings
By Shoemaker + Mattare
ATTORNEYS

United States Patent Office 2,938,689
Patented May 31, 1960

2,938,689
SHOCK-ABSORBING AIR CUSHION

William Thomas Rollings, Binsted, England, assignor to G. Q. Parachute Company Limited, Woking, England, a British company Filed Jan. 16, 1958, Ser. No. 709,266

Claims priority, application Great Britain Jan. 21, 1957

5 Claims. (Cl. 244—138)

This invention relates to shock-absorbing air cushions for loads falling to the ground, and more particularly for stores and equipment dropped by parachute from the air, the cushion being intended to reduce the liability to damage at the landing of the load.

The main object of the invention is to provide an improved device of this character suitable for adequate cushioning of a heavy load, such as a motor vehicle dropped by one or more parachutes.

Another object of the invention is to provide a device of this character comprising two air cushions which operate successively, one at the moment of touch down and the other in a second stage for absorbing the shock due to further descent of the load.

A specific object is to provide a device comprising two air cushions operating successively, one when the device first reaches the ground, and the other being inflated automatically by the collapse of the first, so as to absorb the shock in a second stage.

A further object of the invention is to provide a device of this character suitable for cushioning a heavy load consisting of a motor vehicle, the device including a platform for supporting the vehicle from the parachute or parachutes, and having two air cushions secured respectively above and beneath the platform, these two cushions operating in succession, and the upper cushion being so arranged that the vehicle can be driven onto the platform.

Other objects and advantages of the invention will hereinafter appear from the following description, given with reference to the accompanying drawings, in which:

Fig. 1 is a perspective view of the improved air-cushion device in a convenient embodiment, shown as carrying a motor vehicle which is being dropped by parachute.

Figs. 6 and 7 are details on a larger scale showing the preferred construction of air-cushion outlet and inlet valves respectively.

Figure 2:
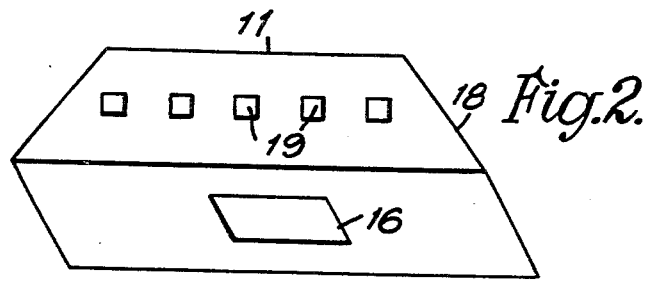
Figs. 2, 3 and 4 show the main elements of the device separated from one another.

As seen in Fig. 1, the device is employed for the dropping of a motor vehicle 10, upper and lower air cushions 11 and 12 respectively being connected to opposite faces of a platform 13 on which the vehicle can be secured by any suitable means, the corners 14 of the platform being provided with rings or the like arranged to receive lifting slings 15 for attachment to one or more parachutes, not shown.

The cushions may be made of flexible and porous fabric, such as canvas, which will allow slow escape of air as each cushion becomes inflated and during its subsequent deflation, but such deflation is facilitated by the provision of one or more outlet valves in each case.

The bottom of the upper cushion 11 has a central inlet opening 16 (see Fig. 2), which will communicate with an opening 17 in the middle of the platform 13 (see Fig. 3) for inflation of the cushion during descent; around the cushion edges, which will form side and end walls 18 when inflated, there may be provided a number of outlet valves 19 which limit its inflation during descent to the pressure necessary for it to conform to the underside of the vehicle and prevent relative movement or chafing.

The cushion 11 may be stowed flat upon the platform 13 beforehand, thus enabling the vehicle 10 to be driven over it into place; alternatively, the deflated cushion may be folded or rolled up to fit between the front and rear wheels of the vehicle after the latter has been secured on the platform 13, the cushion being held in folded or rolled condition by cord-ties (not shown) which will break to permit expansion of the cushion as soon as the internal pressure builds up sufficiently during the descent.

The lower cushion 12 (see Figs. 4 and 5), which is to be secured beneath the platform 13, is divided by means of diaphragms 20 into a number of compartments, for example two compartments 21 extending across the ends of the platform and two compartments 22 extending along the sides of the platform, leaving in the middle a pressure chamber 23 open at bottom for inflation during descent and communicating at top with the inlet opening 17 in the platform 13, which leads to the upper cushion. Each of these four compartments 21, 22 may be sub-divided by means of other diaphragms 24, as best seen in Fig. 5; each compartment is provided with outlet valves 25 for escape of air through the side and end walls 26, and with one or more inlet openings 27 in its bottom surface 28, these inlet openings 27 being arranged to admit air for inflation of the several compartments during the descent of the load. As shown in Fig. 7, these openings may be provided with inlet valves consisting of canvas or other flexible flaps 29, stitched to the bottom surface 28 along one edge 30 and along their sides 31, and fitted with reinforcing panels 32 made of thin vulcanized fibre or the like. It will be noted that outlet valves 25 are provided not only around the sides and ends of the lower cushion 12, to supplement the escape of air through the porous material, but also in the internal walls of the compartments 22, 24 around the pressure chamber 23, so that the air escaping through these valves will assist in building up the pressure in the chamber 23 when the lower cushion strikes the ground and begins to collapse.

Fig. 6 shows one of these outlet valves 25, likewise consisting of a flexible flap stitched to the compartment wall 26 along one edge 30 and along two sides 31, the flap being fitted with a reinforcing panel 32 made of fibre or the like. The outlet valves 19 of the upper cushion 11 may be similar to these outlet valves 25 of the lower cushion 12.

During the descent of the motor vehicle by parachute, and before reaching the ground, the lower cushion 12 will have been inflated by the entry of air through the inlet openings 27, the several compartments 22, 24 or their sub-divisions thus containing air at a slight pressure above atmospheric; the upper cushion 11 will also have become partially inflated by the entry of air through the inlet openings 17, 16 during the descent, and will have risen sufficiently to press against and conform to the shape of the underside of the vehicle resting on the platform 13. Contact with the ground will cause collapse of the lower cushion 12, the internal pressure therein building up rapidly and the platform 13 with the vehicle supported thereon being thus effectively cushioned in its fall to the ground. As the walls 26 collapse, the air contained in the middle pressure chamber 23, now closed at the bottom 28 resting on the ground, will be forced up through the inlet openings 17, 16 into the upper cushion 11, thereby increasing its upward pressure against the underside of the vehicle, so that the latter will be further cushioned in relation to the platform 13.

Figure 3:
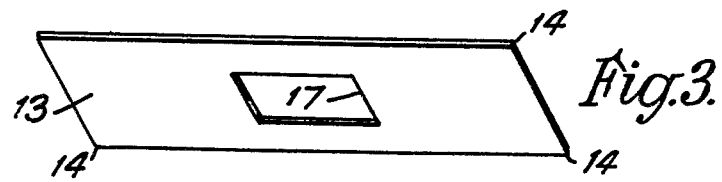
Figure 4:
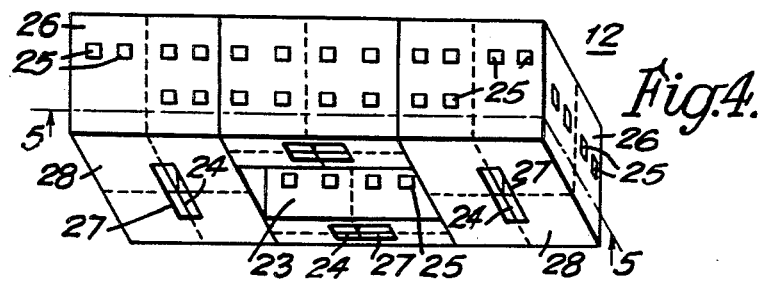
Figure 5:
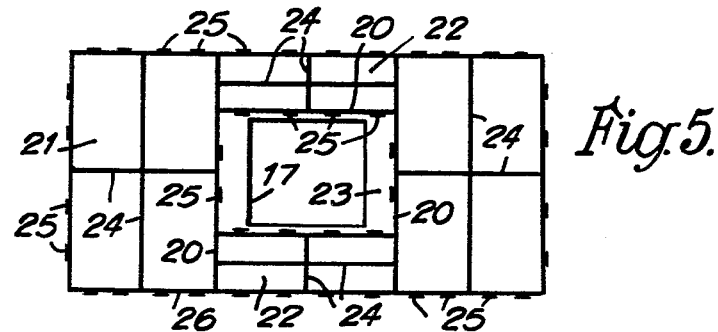
Fig. 5 is an inverted plan in section on the plane 5—5 of Fig. 4.

The cushions 11, 12 may be made in complete form, as shown separately in Figs. 2 and 4, and secured to the respective faces of the platform 13, or they may be made in sections, connected together and secured to the platform 13 by lacing or other means, each section forming or comprising one or more separate or subdivided compartments such as shown at 22, 24, with individual inlet and outlet valves.

What I claim is:

1. A two-stage air-cushion device for absorbing the shock of a load falling to the ground, comprising an upper air cushion, a lower air cushion, and a platform interposed between said cushions for supporting the load, the lower cushion being collapsible upon striking the ground, and means for inflating the upper cushion by air forced from said lower cushion by its collapse on the ground, said upper cushion then pressing upwards against the load and cushioning the latter in relation to the platform.

2. An air-cushion device for absorbing the shock of a load falling to the ground, comprising an upper air cushion, a lower air cushion, and a platform interposed between said cushions for supporting the load, the lower cushion being provided with air inlets and with outlet valves serving respectively for inflation during descent of the load and for escape of air when the lower cushion strikes the ground, said platform having an opening therethrough in communication with an outlet valve of said lower cushion, and the upper cushion being provided with an air inlet in communication with said platform opening, whereby air escaping through said outlet valve from said lower cushion as it collapses on the ground is passed through the platform opening into said upper cushion.

3. An air-cushion device for absorbing the shock of a load falling to the ground, comprising an upper air cushion, a lower air cushion, a platform interposed between said cushions for supporting the load, the lower cushion being provided with air inlets and with outlet valves, said inlets serving for inflation during descent of the load and said outlet valves serving for escape of air when the cushion strikes the ground, said platform having an opening therethrough in communication with at least one outlet valve of said lower cushion, and a pressure chamber within said lower cushion, at least one of said outlet valves of said lower cushion being arranged to pass air through said platform opening into said pressure chamber, and said pressure chamber being caused to pass air into said upper cushion when said lower cushion collapses on the ground.

4. An air-cushion device for absorbing the shock of a load falling to the ground, comprising an upper air cushion, a lower air cushion, and a platform interposed between said cushions, means for supporting said platform when carrying the load, the bottom of the lower cushion being provided with air inlets serving for its inflation during descent of the load, said lower cushion being also provided with outlet valves for escape of air when said cushion strikes the ground, one of said outlet valves being in the top of said lower cushion, said platform having an opening therethrough in communication with said one outlet valve in the top of said lower cushion, the bottom of the upper cushion having an inlet in communication with the opening in said platform, and said lower cushion being caused to pass air through said platform opening for inflation of said upper cushion when said lower cushion collapses on the ground.

5. An air-cushion device for absorbing the shock of a falling load, comprising upper and lower air cushions, a platform interposed between said cushions for supporting the load, the bottom of the lower cushion being provided with at least one inlet for its inflation during descent of the load, said lower cushion being also provided with outlet valves for escape of air when said cushion strikes the ground, one of said outlet valves being in the top of said lower cushion, said platform having an opening in communication with said one outlet valve in the top of said lower cushion, the bottom of said upper cushion having an inlet in communication with the opening in said platform, and said lower cushion being compressed by said load and thereby caused to pass air through said platform opening for inflation of said upper cushion when said lower cushion collapses on the ground.

References Cited in the file of this patent

UNITED STATES PATENTS

| | | |
|---|---|---|
| 2,557,105 | Hight | June 19, 1951 |
| 2,712,913 | Stanley | July 12, 1955 |
| 2,713,466 | Fletcher et al. | July 19, 1955 |
| 2,840,194 | Mitchell et al. | June 24, 1958 |

FOREIGN PATENTS

| | | |
|---|---|---|
| 572,152 | Great Britain | Sept. 25, 1945 |